Patented Mar. 15, 1949

2,464,753

UNITED STATES PATENT OFFICE 2,464,753

ALLYL GLYCIDYL MIXED DIETHER OF BIS-(4-HYDROXYPHENYL)-2,2-PROPANE AND POLYMERS THEREOF

Edward C. Shokal, Oakland, and Lynwood N. Whitehill, Berkeley, Calif., assignors to Shell Development Company, San Francisco, Calif., a corporation of Delaware No Drawing. Application March 25, 1947, Serial No. 737,108

14 Claims. (Cl. 260—80)

This invention relates to a new class of mixed ethers of bis-phenols and the polymers therefrom. More particularly, the invention is concerned with the allyl, glycidyl mixed diether of bis-(4-hydroxyphenyl)-2,2-propane and its polymers.

Prior to the present invention such ethers as diallyl ether have been polymerized to resinous polymers. Complete polymerization of such ethers gives an insoluble and infusible polymer owing to the fact that the ethers are bi-functional in containing two olefinic groups through which polymerization may occur. Compounds containing only a single olefinic group, as is the case with vinyl acetate, for example, are incapable of being polymerized to an infusible state. Polymers which are insoluble and infusible are of greater commercial value since coatings and the like made from them have practically complete resistance to all solvents and they are not affected by heat, except when the temperature is so high that charring occurs. However, considerable difficulties are encountered in manufacturing articles by polymerization of compounds containing two olefinic groups. Upon polymerizing such a bi-functional compound, polymerization progresses with a decrease in percentage of monomer and an increase in percentage of polymer. The first formed polymer is fusible as well as being soluble in many common organic solvents including its monomer. This partial polymer presumably has a molecular structure which is linear and contains unpolymerized or free olefinic groups therein. Further polymerization of the partial polymer results in cross-linking between separate partial polymer molecules by carbon-to-carbon bonding through the free olefinic groups so that a three dimensional structure is formed. As cross-linking occurs and progresses, the linear polymer is converted to a gel. This gel is characterized by being insoluble although it can be fused upon application of heat and pressure. Further polymerization of the gel converts it to the insoluble and infusible completely polymerized polymer.

The first formed linear polymer is the most useful intermediate type since it is fusible and is thus ideally suited for molding operations. It is also soluble in many organic solvents which permits it to be used in coating compositions such as lacquers and paints. The gel polymer is insoluble even in its own monomer and the last mentioned uses are precluded. When an ether like diallyl ether is polymerized the linear polymer forms first, but before all of the monomer is converted to this desired linear partial polymer the mixture gels. This phenomenon takes place because of the competitive reactions occurring simultaneously in the polymerizing mixture. One reaction is the linking together of monomeric molecules of diallyl ether to form linear polymer molecules. The other is the cross-linking which occurs between linear polymer molecules through the free olefinic groups therein. It is not possible to effect the polymerization so that the first reaction will occur to the exclusion of the second. Both reactions take place through the same type of mechanism, namely, by addition polymerization. As soon as an appreciable concentration of linear polymer is built up, the second reaction may occur with resulting formation of the undesired gel even though a large proportion of unpolymerized monomer is present in the system. We avoid all of these difficulties through use of a compound which contains two groups through which polymerization may occur by different mechanisms rather than the same mechanism as is the case with diellyl ether. The present invention provides bi-functional ethers which are capable of forming three dimensional polymers having the valuable properties of insolubility and infusibility, but they contain dissimilar polymer forming groups. The result is that the ethers of the invention can be completely polymerized through one group to the exclusion of polymerization of the other group. An entire mass of monomer can thus be polymerized to linear polymers without danger of cross-linking which causes the undesirable premature gelling.

The two dissimilar polymer forming groups contained in the ethers of the invention are an epoxide group and an olefinic group. Thus, a typical member of the class is allyl, glycidyl diether of bis-(4-hydroxyphenyl)-2,2-propane which contains an epoxide group in the glycidyl radical thereof and an olefinic group in the allyl radical. These two dissimilar groups form polymers by entirely different reaction mechanisms. The ether can be subjected to conditions whereby polymerization occurs through one group to the substantial exclusion of the polymerization through the second group. The resulting polymer can then be further polymerized under different conditions through the unaffected second group so that an infusible and insoluble polymer is formed. The dissimilarity of the polymer forming groups enables control over the polymer formation so as to produce polymers having a versatility of properties not heretofore possible. For example, allyl, glycidyl diether of bis-(4-hydroxyphenyl)-2,2-propane can be first subjected to conditions whereby addition polymerization occurs through the allyl group so as to form a linear polymer which is soluble in solvents including its monomer. This linear polymer formed by the addition polymerization reaction can then be subjected to the epoxide coupling reaction through the free glycidyl group of the linear polymer. Or if desired, the ether can be first subjected to the epoxide coupling reaction through the glycidyl radical and the resulting polymer is then further polymerized by addition polymerization which occurs through the free allyl groups. By the epoxide coupling reaction reference is made to the reaction which couples together a plurality of epoxide groups whereby a polymer molecule is formed by opening of the epoxide ring and joining together of the plurality of organic substances of the epoxide ring by ether linkages. This is the same reaction which occurs when ethylene oxide is polymerized to a polymer which is a polyether. This polymer formed by the epoxide coupling reaction is soluble in many common organic solvents. In addition, it is fusible and accordingly, adapted to conventional molding operations. Owing to the presence of the free allyl groups, the polymer can be subjected to addition polymerization through those allyl groups during the molding thereof whereby it is set or cured to the desirable insoluble and infusible form.

The compounds of the invention are mixed ethers of a bis-(hydroxyl-aryl) alkane having each of the hydroxyaryl compounds linked to the same carbon atom of the alkane and having the hydrogen atom of the hydroxy group of one hydroxyaryl radical replaced by the radical linked directly the hydroxy radical of a beta,gamma-monoolefinic monohydric alcohol while the hydrogen atom of the hydroxy group of the other hydroxyaryl radical has been replaced by the radical linked directly to the hydroxy group of a monohydroxy epoxyalkane. Preferably the compounds contain 2 to 6 carbon atoms in the substituted alkane radical and 6 to 10 carbon atoms in the hydroxyaryl radicals, which aryl radical thereof is also preferably mononuclear. It is also preferred that each of the radicals substituted for the hydrogen atom of the hydroxy group of the hydroxyaryl radicals contain 3 to 10 carbon atoms.

The diethers of the invention are prepared by reacting about equimolar amounts of the bis-(hydroxyaryl) alkane with the corresponding chloride or bromide of the beta,gamma-monoolefinic monohydric alcohol in the presence of sufficient strong base such as sodium or potassium hydroxide so that the monoether is formed. This half ether is then further reacted with the corresponding chloride or bromide of the monohydroxy epoxyalkane, also in the presence of sufficient strong base to neutralize the liberated hydrogen chloride or bromide. Both of these reactions are conveniently effected by adding the base to the bis-phenol and then adding the organic chloride or bromide to the heated reaction mixture which is further heated for a time sufficient to effect completion of the reaction. Temperatures of about 60 to 150° C. are suitable for this purpose. The metal halide salt which forms from the reaction is filtered from the reaction mixture in those cases where substantially anhydrous reactions are employed. When water is present from use of an aqueous solution of base, the desired ether may be recovered from the reaction mixture by extraction with a lower aliphatic ether such as dipropyl or dibutyl ether. In this manner any of the ethers of the invention may be prepared. For example, allyl, glycidyl mixed diether of bis-(4-hydroxyphenyl)-2,2-propane is prepared by first reacting allyl chloride with the bis-phenol. About 34.2 g. of sodium hydroxide in 300 cc. of absolute ethanol is added to 195 g. of bis-(4-hydroxyphenyl)-2,2-propane and then about 98 g. of allyl chloride is added. The mixture is refluxed on a steam bath for about 7 hours after which the precipitated sodium chloride is filtered therefrom. The allyl chloride and ethyl alcohol are evaporated off under reduced pressure so as to leave a residue of about 229 g. of the monoallyl ether of bis-(4-hydroxyphenyl)-2,2-propane. About 221.5 g. of this monoallyl ether is mixed with 76.4 g. of epichlorhydrin and about 36 g. of sodium hydroxide dissolved in about 100 cc. of water are added to the mixture which is heated at about 70 to 80° C. The mixture is then heated between 80 and 100° C. for an additional hour to complete the reaction. Upon cooling two layers separate and the organic layer is taken up in diisopropyl ether. This solution is washed with water until neutral and is dried over magnesium sulfate. The propyl ether is evaporated by heating and pumping down to 150° C. at 2 mm. pressure. In order to be sure that all of the phenol is removed, the resulting product is again washed with 20% sodium hydroxide and filtered through a sintered glass funnel. The resulting product is the desired allyl, glycidyl diether of bis-(4-hydroxyphenyl)-2,2-propane which gives on analysis 78.0% carbon (theoretical 77.94) and 7.50% hydrogen (theoretical 7.46).

In like manner other compounds of the invention are prepared by substituting for the bis-(4-hydroxyphenyl)-2,2-propane such other representative bis-(hydroxyaryl)alkanes as bis-(4-hydroxyphenyl)-1,1-ethane, bis - (4 - hydroxyphenyl)-1,1-propane, bis - (4 - hydroxyphenyl)-1,1-butane, bis-(4-hydroxyphenyl) - 1,1 - isobutane, bis-(4-hydroxyphenyl)-2,2-butane, bis-(4-hydroxyphenyl)-2,2-pentane, bis - (4 - hydroxyphenyl)-2,2-hexane, bis-(4-hydroxyphenyl)-1,1-isopentane, bis-(4-hydroxyphenyl)-3,3-pentane, bis-(4-hydroxy-2-methylphenyl)-1,1-ethane, bis-(4-hydroxy - 2 - methylphenyl)-2,2-propane, bis-(4-hydroxy-2-methylphenyl)-1,1-isobutane, bis-(4-hydroxy-2-methylphenyl)-2,2-hexane, bis-(4-hydroxy-2,5-dimethylphenyl) -2,2- propane, bis-(4-hydroxy-2-isopropylphenyl)-2,2-propane, bis-(4-hydroxy-2-isopropylphenyl)-1,1- ethane, bis-(4-hydroxy-2-tertiary-butylphenyl)-2,2-propane, and bis-(4-hydroxy-3-methylphenyl)-2,2-butane. The bis-(monohydroxyaryl) alkanes are obtainable in well known manner by condensing phenol or alkyl-substituted phenols with aldehydes or ketones. These bis-phenols have the aryl radical linked to the same carbon atom of the substituted alkane. They are thus alkylidene compounds which, when derived from aldehydes, contain a 1,1-alkalidene radical, and when derived from ketones, contain a 2,2-alkylidene radical or 3,3-alkylidene radical, etc.

In order to prepare ethers of the invention containing higher alkenyl radicals, allyl chloride is replaced by the corresponding chlorides or bromides of other beta,gamma-monoolefinic monohydric alcohols such as methallyl chloride, crotyl chloride, crotyl bromide, methyl vinyl carbinyl chloride, tiglyl chloride, angelyl bromide, 2-hexenyl chloride, 2-octenyl bromide, 2-decenyl chloride and the like. It is also preferred to have an ether from a beta,gamma-monoolefinic monohydric alcohol of 3 to 6 carbon atoms containing a terminal methylene group as is the case with such representative compounds as allyl alcohol and beta-alkyl allyl alcohols like methallyl alcohol, ethallyl alcohol and propallyl alcohol.

While glycidyl ethers are particularly preferred, the compounds containing higher groups are also suitable. These are prepared by substituting for epichlorhydrin such representative corresponding chlorides or bromides of monohydroxy epoxyalkanes as 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxypentane, 2-chloromethyl-1,2-epoxybutane, 1-bromo-4-methyl-3,4-epoxypentane, 1-bromo-4-ethyl-2,3-epoxypentane, 4-chloro-2-methyl-2,3-epoxypentane, 1-chloro-2,3-epoxyoctane, 1-chloro-2-methyl-2,3-epoxyoctane, or 1-chloro-2,3-epoxydecane.

The mixed ethers of the invention are polymerized by subjecting them to the epoxide coupling reaction preferably in the presence of a so-called Friedel-Crafts catalyst such as aluminum chloride, aluminum bromide, zinc chloride, zinc bromide, boron trifluoride, silicon tetrachloride, stannic chloride, stannic bromide, titanium tetrachloride, bismuth trichloride and the like. Stannic chloride has been found to be a particularly preferred catalyst owing to its high activity. About 1% to 10% of catalyst is a suitable quantity to effect the desired polymerization. While the polymerization can be effected through the epoxide coupling reaction with the pure ether, it is ordinarily preferred to effect the polymerization in the presence of a solvent. The polymerization reaction with the pure ether may become unduly violent and by using solvents, the reaction can be properly controlled. For this purpose, petroleum ether (B. P. 35 to 60° C.) is quite suitable in that it affords a convenient means of controlling the temperature and dissipating the heat of polymerization. The mixed diether is dissolved in the petroleum ether and the solution placed in a vessel fitted with a reflux condenser. The catalyst is added and the temperature will rise no higher than the boiling point of the solvent. Other inert solvents can be used if desired such as chloroform, benzene, ethyl or isopropyl ether, etc. Ordinarily a solution containing about 10% to 50% of the ether is used.

The polymerization can be effected over a considerable range of temperature. Thus, temperatures from —50° C. to about 100° C. are suitable. The character of the polymer is dependent to a considerable extent upon the temperature of polymerization. In general, polymerization at or below atmospheric temperature (about 20° C.) will give waxy solids while polymerization somewhat above that temperature gives viscous liquids. Preferably the ethers are subjected to the epoxide coupling reaction at a temperature of about 0° C. to 60° C. Another way of preparing the polymers is to treat the monomers with activated clays.

The polymers obtained by the epoxide coupling reaction are soluble in a variety of organic solvents, which solubility enables them to be used in many applications. In general, the polymers are soluble in such dissimilar solvents as lower aliphatic alcohols like methyl and ethyl alcohol; lower ketones like acetone and butanone; and lower aliphatic hydrocarbons like pentane and hexane. Since the polymers contain free olefinic groups capable of addition polymerization, they are well suited to uses in which advantage is taken of their properties of solubility and further polymerizability. One of these uses is as a component in coating compositions wherein a solution of the polymer is applied to the surface of an article, the solvent permitted to evaporate and the polymer subjected to addition polymerization which converts it to the insoluble and infusible polymer providing an extremely resistant protective coating to the article.

The addition polymerization is aided by the presence of a peroxide polymerization catalyst such as benzoyl peroxide, acetyl peroxide, benzoyl acetyl peroxide, tertiary butyl perbenzoate, lauryl peroxide, dibutyryl peroxide, succinyl peroxide, tertiary alkyl hydroperoxides such as tertiary butyl hydroperoxide, di(tertiary alkyl) peroxide such as di(tertiary butyl) peroxide, peracetic acid, perphthalic acid and the like. In further polymerizing the soluble epoxide coupled polymers, about 0.1 to 10% of peroxide catalyst is aded and the mixture is heated at 50° C. to 300° C. until the polymerization is complete. Such treatment converts the initial polymers to their insoluble and infusible form. The initial epoxide coupled polymer is well suited for further polymerization in molding operations whereby valuable form-stable molded articles are produced. Compression, injection or transfer molding operations may be employed wherein molding and addition polymerization is effected at pressure of 100 to 3000 or more pounds per square inch. The epoxide coupled polymer can be introduced in such molding operations as viscous liquid or in solid form such as powder, chips, pellets and the like which are fused in the molding operation so as to form a coherent mass. Such polymer is also suitable for preparing laminated articles by impregnating sheets of paper, cotton fabric, etc., with the polymer and then curing an assembly of superimposed sheets.

Although it is preferred to subject the mixed ethers to the epoxide coupling reaction first and then complete the polymerization of the resulting polymer by addition polymerization, the ethers can, if desired, be first subjected to addition polymerization and this polymer then further polymerized by the epoxide coupling reaction. The linear polymer obtained by addition polymerization can be subjected to the epoxide coupling reaction by baking, if desired, without use of catalyst. Thus, by baking at about 150° C. to 300° C., epoxide coupling will occur and a substantially insoluble and infusible polymer will be obtained.

The ethers can also be polymerized by subjecting them to both the epoxide coupling reaction and addition polymerization simultaneously. This is best done by mixing the peroxide catalyst with the ether and then adding the Friedel-Crafts metal halide. The vigorous reaction which may ensue upon addition of the latter catalyst will supply heat needed to initiate the addition polymerization.

The ethers are also susceptible to polymerization by the action of heat alone whereby tough resins are formed which are insoluble in common organic solvents such as acetone. The extent of polymerization which occurs by the action of heat is dependent upon both time and temperature. Under mild conditions, the ethers are only partially polymerized so that a soluble form of polymer is obtained. By using more severe conditions both the epoxide coupling reaction and the addition polymerization reaction occur so that cross-linking is effected and the polymer obtained is insoluble in acetone. Temperatures of about 100° C. to 275° C. are suitable for effecting the simultaneous polymer-forming reactions. For example, when 19 g. of allyl, glycidyl diether of bis-(4-hydroxyphenyl)-2,2-propane is dissolved in 50 cc. of methyl ethyl ketone and a metal plate dipped into the solution, allowed to drain and baked for ½ hour at about 150° C., the resulting film is tough but soluble in acetone. Upon repeating the baking treatment with another dipped plate for 15 minutes at 200° C., the film is hard to the fingernail and is only softened upon contact with acetone. When the baking is continued for 30 minutes at 200° C., the resulting film is also hard to the fingernail as well as being insoluble in acetone. The film is very tough and does not crack or craze when bent over a one-eighth inch mandrel.

In order to alter the properties of the polymers, the ethers may be copolymerized with various other compounds. Thus, the ethers can be mixed with compounds like ethylene oxide, propylene oxide, isobutylene oxide, epichlorhydrin and the like when they are subjected to the epoxide coupling reaction so as to obtain copolymers with such compounds. Similarly, when the ethers or its epoxide coupled polymer is subjected to addition polymerization, it can be copolymerized with a polymerizable compounds containing a vinylidine group such as styrene, acrylonitrile, vinyl chloride, vinyl acetate, methyl methacrylate, diallyl phthalate and the like. The amount of the copolymerizable compound in admixture with the mixed ether or its partial polymer can be varied over wide limits, say from about 1% to 99%, depending upon the properties desired in the resulting copolymer.

We claim as our invention:

1. A mixed ether of a bis-(hydroxyaryl) alkane which contains hydroxyaryl radicals of 6 to 10 carbon atoms linked to the same carbon atom of the alkane which contains 2 to 6 carbon atoms and having the hydrogen atom of the hydroxy group of one hydroxyaryl radical replaced by an alkene-2-yl radical of 3 to 10 carbon atoms while the hydrogen atom of the hydroxy group of the other hydroxyaryl radical has been replaced by the radical directly linked to the hydroxy group of a monohydroxy epoxyalkane of 3 to 10 carbon atoms having the hydroxy radical linked directly to another carbon atom than the vicinal carbon atoms to which the epoxy oxygen atom is linked.

2. A polymer of the compound defined in claim 1.

3. A mixed ether of bis-(4-hydroxyphenyl)-2,2-propane having the hydrogen atom of one hydroxy group replaced by an alkene-2-yl radical of 3 to 6 carbon atoms containing a terminal methylene group and the hydrogen atom of the other hydroxyl group substituted by the radical directly linked to the hydroxy group of a monohydroxy epoxyalkane of 3 to 10 carbon atoms having the hydroxy radical linked directly to another carbon atom than the vicinal carbon atom to which the epoxy oxygen atom is linked.

4. A polymer of the compound defined in claim 3.

5. The allyl, glycidyl mixed diether of bis-(4-hydroxyphenyl)-2,2-propane.

6. A polymer of allyl, glycidyl mixed diether of bis-(4-hydroxyphenyl)-2,2-propane.

7. The methallyl, glycidyl mixed ether of bis-(4-hydroxyphenyl)-2,2-propane.

8. A polymer of methallyl, glycidyl mixed ether of bis-(4-hydroxyphenyl)-2,2-propane.

9. A process for polymerizing a mixed ether of a bis-(hydroxyaryl) alkane which contains hydroxyaryl radicals of 6 to 10 carbon atoms linked to the same carbon atom of the alkane which contains 2 to 6 carbon atoms and having the hydrogen atom of the hydroxy group of one hydroxyaryl radical replaced by an alkene-2-yl radical of 3 to 10 carbon atoms while the hydrogen atom of the hydroxy group of the other hydroxyaryl radical has been replaced by the radical directly linked to the hydroxy group of a monohydroxy epoxyalkane of 3 to 10 carbon atoms having the hydroxy radical linked directly to another carbon atom than the vicinal carbon atoms to which the epoxy oxygen atom is linked, which comprises heating said ether for a time sufficient to form a polymer which is a solid at 20° C.

10. A process for polymerizing a mixed ether of bis-(4-hydroxyphenyl)-2,2-propane having the hydrogen atom of one hydroxy group replaced by an alkene-2-yl radical of 3 to 6 carbon atoms containing a terminal methylene group and the hydrogen atom of the other hydroxyl group has been substituted by the radical directly linked to the hydroxy group of a monohydroxy epoxyalkane of 3 to 10 carbon atoms having the hydroxy radical linked directly to another carbon atom than the vicinal carbon atoms to which the epoxy oxygen atom is linked, which comprises heating the ether in the presence of a peroxide polymerization catalyst and a Friedel-Crafts metal halide.

11. A process of polymerizing allyl, glycidyl ether of bis-(4-hydroxyphenyl)-2,2-propane, which comprises heating the ether in the presence of stannic chloride and then heating the resulting polymer in the presence of a polymerization catalyst.

12. A process of polymerizing allyl, glycidyl ether of bis-(4-hydroxyphenyl)-2,2-propane, which comprises heating the ether in the presence of a peroxide polymerization catalyst.

13. A process of polymerizing methallyl, glycidyl ether of bis-(4-hydroxyphenyl)-2,2-propane, which comprises heating the ether in the presence of stannic chloride and then heating the resulting polymer in the presence of a polymerization catalyst.

14. A process of polymerizing methallyl, glycidyl ether of bis-(4-hydroxyphenyl)-2,2-propane, which comprises heating the ether in the presence of a peroxide polymerization catalyst.

EDWARD C. SHOKAL.
LYNWOOD N. WHITEHILL.

No references cited.